United States Patent Office 3,736,354
Patented May 29, 1973

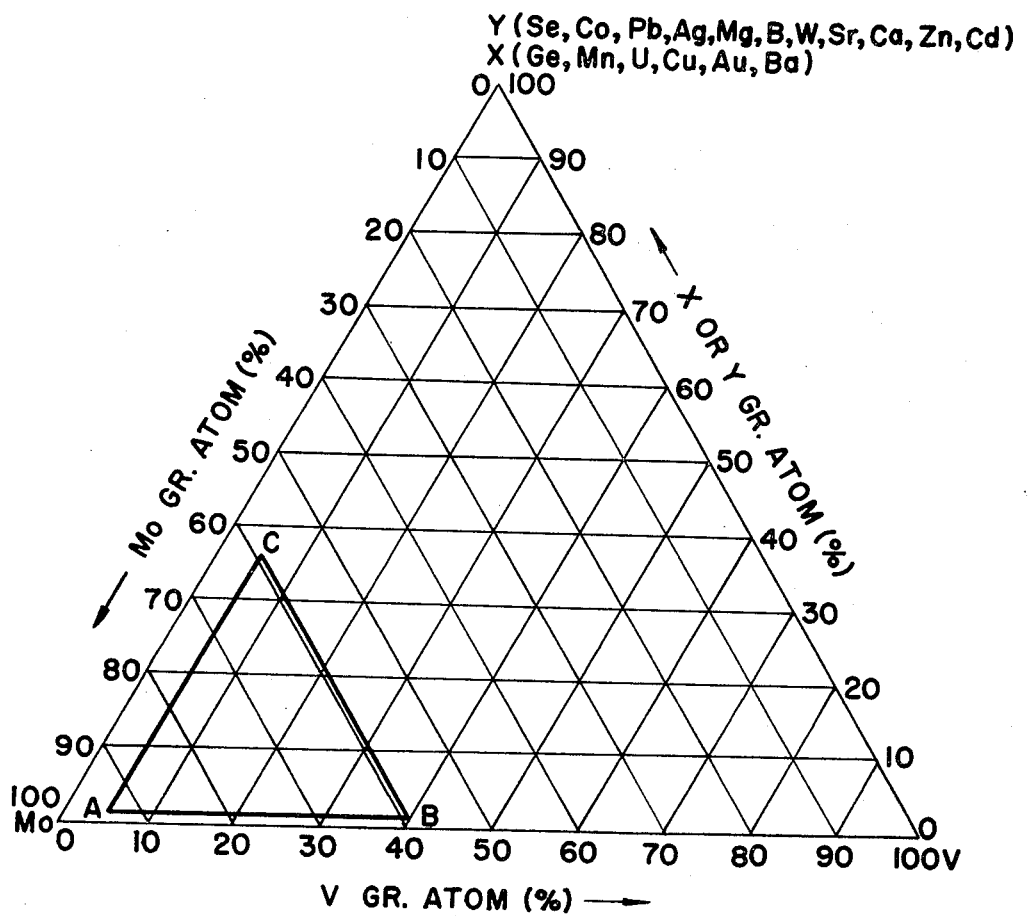

3,736,354
PROCESS FOR THE PRODUCTION OF
ACRYLIC ACID
Masaya Yanagita, Tokyo, Masao Kitahara, Chiba-shi, and Yoshimichi Abe, Tokyo, Japan, assignors to Rikagaku Kenkyusho, Saitama-ken, Japan
Filed May 8, 1969, Ser. No. 823,112
Claims priority, application Japan, May 13, 1968, 43/32,102; June 12, 1968, 43/89,358
Int. Cl. C07c *51/26*
U.S. Cl. 260—530 N          9 Claims

ABSTRACT OF THE DISCLOSURE

A high yield process for producing pure acrylic acid by the catalytic vapor phase oxidation of acrolein with molecular oxygen using a highly active catalyst comprising an oxide or an oxygenated compound of vanadium, and molybdenum, and at least one of the elements of Ge, U, Mn, Cu, Au and Ba, or at least one of the elements of Se, Co, Pb, Ag, Mg, B, W, Sr, Ca, Zn and Cd.

The present invention relates to a process for the production of acrylic acid by the catalytic vapor phase oxidation of acrolein using a catalyst consisting of the oxides or oxygenated compounds of vanadium, and molybdenum, and at least one of the elements of germanium, uranium, manganese, copper, gold, and barium, or at least one of the elements of selenium, cobalt, lead, silver, magnesium, boron, strontium, calcium, zinc and cadmium.

Many methods have been proposed for the production of acrylic acid by the catalytic vapor phase oxidation of acrolein, for instance British Patent No. 903,034 wherein a method of oxidizing acrolein using a Mo—V catalyst is described. However, since the activity of the catalyst disclosed in this British patent is too strong, the reaction is accompanied by generation of large amount of heat and it is difficult in such a conventional method to obtain acrylic acid with a good selectivity and a high yield.

The inventors have also provided various catalysts for the oxidation of acrolein and as the result of investigation about the development of the acrolein oxidation by means of catalysts suitable for a fluidized bed, it has now been found that a catalyst consisting of the oxides or the oxygenated compounds of vanadium, and molybdenum, and at least one element selected from the group consisting of germanium, uranium, manganese, copper, gold and barium, or at least one element selected from the group consisting of selenium, cobalt, lead, silver, magnesium, boron, strontium, calcium, zinc and cadmium, produces acrylic acid with high yield and that the activity of the catalyst is not decreased after a long run in fluidized bed.

The accompanying drawing is a triangular coordinate showing the composition range (atomic ratio percent) of the metal elements composing the catalyst used in the present invention.

The triangular coordinate shows the compounding ratio of vanadium, and molybdenum, and X or Y wherein X is at least one element of germanium, uranium, manganese, copper, gold and barium and Y is at least one element of selenium, cobalt, lead, silver, magnesium, boron, strontium, calcium, zinc and cadmium, and the suitable compounding ratio (atomic ratio percent) of the elements of the catalyst used in the present invention is within an area, surrounded by a point A(V=5, Mo=94, and X=Y=1), point B(V=40, Mo=59 and X=Y=1) and point C(V=5, Mo=59, and X=Y=36). If the compounding ratio of each element is outside the area ABC, the conversion rate of acrolein and the selectivity for acrylic acid are reduced and hence the yield of acrylic acid is decreased.

The preparation of the catalysts used in the present invention will now be expalined.

The raw materials for the preparation of the catalysts of the present invention are as follows: as the vanadium source, vanadium pentoxide ($V_2O_5$), ammonium metavanadate ($NH_4VO_3$), vanadium oxyacetyl acetate $$(VO(C_5H_7O_2)_2,$$

and a nitrate, acetate, chloride, etc., of vanadium may be used. As the molybdenum source, molybdenum trioxide ($MoO_3$), ammonium molybdate (($NH_4)_6Mo_7O_{24} \cdot 4H_2O$, $5(NH_4)_2O \cdot 12MoO_3 \cdot 7H_2O$, etc.), molybdic acid $$(H_2MoO_4 \cdot H_2O),$$

and a nitrate, acetate, chloride, etc. of molybdenum may be used.

Also, as the sources of X or Y component, various nitrates, acetates, chlorides, oxides of the metal elements are used. For example, as the germanium sources, germanium monoxide (GeO), germanium dioxide ($GeO_2$), etc. are used; as the uranium sources, uranium dioxide ($UO_2$), uranium trioxide ($UO_3$), uranyl chloride ($UO_2Cl_2$), uranyl nitrate ($UO_2(NO_3)_2 \cdot 6H_2O$), uranyl acetate ($UO_2(OCOCH_3)_2 \cdot 2H_2O$); etc.; as the manganese sources, managanese monoxide (MnO), maganese dioxide ($MnO_2$), manganese nitrate ($Mn(NO_3)_2 \cdot 4H_2O$), manganese carbonate ($MnCO_3$), manganese acetate $$(Mn(OCOCH_3)_2 \cdot 4H_2O$$

and $Mn(OCOCH_3)_2)$, etc.; as the copper sources, cuprous chloride ($Cu_2Cl_2$), cupric chloride ($CuCl_2$), cuprous oxide ($Cu_2O$), cupric oxide (CuO), cupric nitrate $$(Cu(NO_3)_2 \cdot 3H_2O),$$

cuprous carbonate ($Cu_2CO_3$), basic cupric carbonate ($CuCO_3 \cdot Cu(OH)_2$), cupric acetate ($Cu(OCOCH_3)_2$), etc.; as the gold sources, chloroauric acid $$(AuCl_3 \cdot HCl \cdot 4H_2O)$$

and the like; as the barium sources, barium nitrate ($Ba(NO_3)_2$), barium acetate ($Ba(OCOCH_3)_2$), barium chloride ($BaCl_2 \cdot 2H_2O$), etc.; as the selenium sources, selenium dioxide ($SeO_2$), and the like; as the lead sources, lead nitrate ($Pb(NO_3)_2$), and the like; as the cobalt sources, cobalt nitrate ($Co(NO_3)_2 \cdot 6H_2O$) and the like; as the silver sources, silver nitrate ($AgNO_3$) and the like; as the magnesium sources, magnesium nitrate $$(Mg(NO_3)_2 \cdot 6H_2O)$$

and the like; as the boron sources, boric acid ($H_3BO_3$) and the like; as the strontium sources, strontium nitrate ($Sr(NO_3)_2 \cdot 4H_2O$) and the like; as the calcium sources, calcium nitrate ($Ca(NO_3)_2 \cdot 4H_2O$) and the like; as the zinc sources, zinc nitrate ($Zn(NO_3)_2 \cdot 6H_2O$) and the like; and as the cadium sources, cadmium nitrate $$(Cd(NO_3)_2 \cdot 4H_2O)$$

and the like are used.

For preparing the catalyst of the present invention, one of aforesaid molybdenum compound is mixed with one of aforesaid vanadium compound in a desired compounding ratio and the mixture is uniformly dispersed or dissolved under heating in a proper amount of warm water. To the solution or the suspension is added one or more aforesaid compounds of germanium, uranium, manganese, copper, gold and barium, or one or more aforesaid compounds of selenium, cobalt, lead, silver, mangnesium, boron, strontium, calcium, zinc and cadmium. It is desirable, in this case, to heat the system to provide a homogeneous solution of the components. In addition, if necessary, a suitable amount of aqueous ammonia may be added to the system.

A suitable carrier is impregnated with the suspension or the solution prepared, then the resulting mixture is gradually heated to dryness with agitation on a water bath, or the suspension or the solution is added to an aqueous sol of a carrier component (e.g., silica sol), then the resulting mixture is heated to dryness on a water bath and finely pulverized. In this case, fine powders may, of course, be prepared by directly subjecting the mixture to spray drying. The powders obtained by spray drying have suitable grain size as a catalyst for a fluidized bed but the powders may be further pelletized to suitable shape for a fixed bed system.

As the carrier for the catalyst used in the present invention, any carrier usually employed in this kind of oxidation reaction, such as, silica, fire stone, aluminum phosphate, pumice, etc., can be used. However, among them, silica is preferable. The proportion of catalytic elements $V_2O_5$, $MoO_3$ and one or more oxides of X ($GeO_2$, $UO_2$, $MnO_2$, $CuO$, $Au_2O_3$ and $BaO$) or Y ($SeO_2$, $CoO$, $PbO$, $Ag_2O$, $MgO$, $B_2O_3$, $SrO$, $CaO$, $ZnO$, and $CdO$) is desirably 10–100 parts by weight per 100 parts by weight of a carrier.

The grain size of the catalyst is not critical. The grain size of the catalyst should be properly selected depending on the oxidation system to be employed, such as a fluidized bed system, a fixed bed system, a moving bed system, etc.

The catalyst prepared by evaporation to dryness or by spray drying is charged into a reaction tube, then heat-treated at first at 200–350° C. for 1–20 hours with air (1st pre-treatment with air), and then treated at 300–450° C. for 1–5 hours with gaseous feed introduced into the reaction tube for stabilizing the catalyst activity (2nd pre-treatment with gaseous feed).

In the 1st pre-treatment, the treatment temperature is most important and the pre-treatment must not be carried out at a too high temperature. For example, if the 1st pre-treatment temperature is higher than 450° C., the activity of the catalyst is on the contrary decreased and then the catalyst becomes unsuitable as a catalyst for the oxidation of acrolein.

In the 2nd pre-treatment with gaseous feed, easily oxidizable organic compounds may be used instead of acrolein. As such easily oxidizable organic compounds, there may be used a lower hydrocarbon having 3–4 carbon atoms, such as propylene or isobutylene, an aldehyde such as acetaldehyde or propionaldehyde, an alcohol such as methanol or ethanol, a ketone such as acetone or methyl ethyl ketone, an ether such as dimethyl ether or diethyl ether, and an aromatic hydrocarbon such as benzene, toluene or xylene.

However, the use of acrolein is most effective, that is, it is preferable to conduct the 2nd pre-treatment using a gaseous feed containing acrolein, air and steam. In this case also, if the treatment temperature is too high (e.g., higher than 500° C.), the activity of the catalyst is decreased as in the 1st pre-treatment.

Thus, according to the procedures mentioned above, a catalyst having a most suitable activity for the reaction can be obtained.

For conducting the oxidation reaction of acrolein using the catalyst prepared, the oxidation reaction may be carried out at a desired temperature as it is or by changing the composition of gaseous feed in the 2nd pre-treatment to a desired composition of a gaseous feed for the reaction directly after the end of the 2nd pre-treatment.

The catalyst of the present invention is particularly suitable for a fluidized bed system but may be used also in a fixed bed system or a moving bed system.

Now, the reaction conditions will further be explained in detail in the case of conducting the oxidation of acrolein in a fluidized bed system.

The reaction temperature is slightly varied depending on the kind of carrier to be used but usually 250–400° C. However, particularly good results can be obtained when the reaction is conducted at 270–360° C. It is proper that the space velocity calculated from the apparent volume of catalyst is 500–2500 hr.$^{-1}$, preferably 600–2000 hr.$^{-1}$ (GHSV: volume of gas (liter)/volume of catalyst (liter)·hour (hr.), NTP).

As the oxidizing agent air is usually used but if necessary, oxygen or oxygen-enriched air may be used. The molar ratio of oxygen to acrolein in the gaseous feed is suitably 0.3–10.0, preferably 0.5–5.0. The use of excessive amount of oxygen is undesirable since the oxidation proceeds excessively to decrease the selectivity for acrylic acid and hence the yield of acrylic acid is lowered.

Since the oxidation reaction of the present invention is an exothermic reaction, it is important to obtain a high yield of acrylic acid to remove smoothly the heat of reaction in order to obtain a uniform temperature distribution in the catalyst layer and for the purpose, a diluent having a high heat capacity is preferably used. As the diluent, steam may be employed.

The use of steam provides further the advantage that the danger of explosion of the mixture of combustible gas and oxygen is avoided so that the safety of the operation is increased and at the same time the steam is condensed in a cooling step of a reaction product gas, whereby acrylic acid and others can be collected as an aqueous solution.

Although as the volume of steam is increased, the selectivity for acrylic acid is increased, it is not always profitable to increase the volume of steam since the concentration of acrylic acid in an acidic aqueous solution is decreased, which complicates the subsequent purification procedure. Usually, the molar ratio of steam to acrolein is 3.0–10.0.

The concentration of acrolein is suitably 2.0–10.0% by volume.

A desirable composition of the gaseous feed is 2.0–10.0% in volume of acrolein, 0.5–5.0 molar ratios of oxygen/acrolein, 3.0–10.0 molar ratios of steam/acrolein, and nitrogen or other inert gases. Moreover, to the gaseous feed a hydrocarbon having 3–4 carbon atoms such as propylene and isobutylene may be added. Furthermore, acrolein or acrolein-containing gas prepared by the oxidation of propylene can be used as the raw material in the present invention.

The reaction product gases contain besides acrylic acid a small amount of unreacted acrolein, acetic acid, carbon dioxide, carbon monooxide and others.

In the present invention, the conversion of acrolein (percent), the selectivity for acrylic acid (percent), and the yield of acrylic acid (percent) are defined as follows:

$$\text{Conversion of acrolein} = \frac{(A)}{(B)} \times 100$$

$$\text{Selectivity for acrylic acid} = \frac{(C)}{(A)} \times 100$$

$$\text{Yield of acrylic acid} = \frac{(C)}{(B)} \times 100$$

(A): carbon weight of consumed acrolein;
(B): carbon weight of charged acrolein; and
(C): carbon weight of formed acrylic acid.

This invention will be more explained by following Examples 1–6 and Control Runs (a)–(c).

In these runs, the compounding ratios of the components shown in Table 1 were employed.

Ammonium metavanadate ($NH_4VO_3$) and ammonium p-molybdate (($NH_4$)$_6Mo_7O_{24}$·$4H_2O$) were dissolved in 120 ml. of warm water and after adding to the solution 2 ml. of aqueous 28% ammonia, a solution of germanium oxide ($GeO_2$) in 50 ml. of warm water was added to the resulted solution. The solution was then added to 165 ml. of 30% silica sol (made by Nissan Kagaku K.K.) with stirring and the resulting mixture was dried by means of a spray dryer. The powders thus obtained were dried at 150° C. for about 3 hours in a dryer and thereafter the temperature in the dryer was increased gradually to 285° C.

Thereafter, 50 ml. of the powders were charged in a fluidized bed-type stainless steel reactor having an inside diameter of 36.0 mm. and a length of 800 mm. and then a gaseous feed consisting of 3.8% by volume acrolein, 5.8% by volume oxygen, 31.1% by volume nitrogen, and 59.3% by volume steam was introduced into the reaction system under the condition of a space velocity of 1200 hr.$^{-1}$ at 400° C. for 3 hours. The composition ratios of the catalyst thus prepared were almost the same as those of the raw materials used and the proportion of the catalyst components to the carrier was 20 parts by weight as $V_2O_5$—$MoO_3$—$GeO_2$ per 100 parts by weight of the carrier. After the pre-treatment was finished, the temperature was slowly decreased and sampling and analysis were conducted at a temperature of 360–280° C., whereby the results of reaction at the optimum reaction temperature (a temperature at which the yield of acrylic acid was maximum) were compared, the experimental results are shown in Table 1.

TABLE 1

| Examples and comparison examples | Catalyst composition V/Mo/Ge atomic ratio (percent) | Optimum reaction temperature (° C.) | Reaction product (percent) | | |
|---|---|---|---|---|---|
| | | | Conversion of acrolein | Selectivity for acrylic acid | Yield of acrylic acid |
| 1 | 10/65/25 | 320 | 92.7 | 85.3 | 79.1 |
| 2 | 10/75/15 | 320 | 94.6 | 85.8 | 81.2 |
| 3 | 15/77.5/12.5 | 320 | 97.6 | 87.9 | 85.7 |
| 4 | 15/80/5 | 300 | 98.7 | 89.1 | 88.0 |
| 5 | 25/75/5 | 300 | 97.3 | 88.3 | 85.9 |
| 6 | 35/60/5 | 320 | 90.1 | 83.2 | 75.0 |
| a | 40/35/25 | 360 | 52.9 | 22.9 | 12.1 |
| b | 40/45/15 | 360 | 47.4 | 36.0 | 17.1 |
| c | 35/57.5/7.5 | 340 | 81.6 | 73.1 | 59.7 |

Examples 7–17 and control runs (d)–(g)

The compounding ratios of the catalyst components used in these runs are shown in Table 2.

Ammonium metavanadate and ammonium p-bolybdate were dissolved in 120 ml. of warm water and after adding 2 ml. of 28% aqueous ammonia, an aqueous warm solution of germanium oxide was added to the resulting solution. Then, to 27.2 g. (50 ml.) of silica gel (S–50A: a trade name of Dokai Kagaku K.K.) of 6–10 mesh placed in an evaporating dish is added the resulted solution. The resulted mixture is evaporated to dryness with agitation on a water bath to deposit it on the carrier. The mixture was further dried at 150° C. and 50 ml. of the mixture was charged in a fixed bed-type stainless steel reactor having an inside diameter of 16 mm. and a length of 800 mm. Then, while introducing 500 ml./min. of air to the reactor, the temperature was gradually increased to 300° C., at which temperature the system was maintained for 3 hours and then the supply of air was stopped and a gaseous feed was introduced and the system was maintained at 400° C. for 3 hours. Thus the catalyst for a fixed bed-type system was obtained. The proportion of the catalyst components deposited to the carrier was 20 parts by weight as $V_2O_5$—$MoO_3$—$GeO_2$ per 100 parts by weight of the carrier. Thereafter, the composition of a gaseous feed was changed to 5.0% by volume acrolein, 7.0% by volume oxygen, 48% by volume nitrogen, and 40% by volume steam (space velocity 1050 hr.$^{-1}$) and while reducing the temperature, samples were collected at a temperature of 360–280° C. and analyzed, whereby the results of the reaction at the optimum reaction temperature were compared. The experimental results are shown in Table 2.

TABLE 2

| Examples and comparison examples | Catalyst composition V/Mo/Ge atomic ratio (percent) | Optimum reaction temperature (° C.) | Reaction product (percent) | | |
|---|---|---|---|---|---|
| | | | Conversion of acrolein | Selectivity for acrylic acid | Yield of acrylic acid |
| 7 | 10/75/15 | 340 | 94.3 | 83.6 | 78.9 |
| 8 | 20/65/15 | 340 | 95.8 | 77.9 | 74.6 |
| 9 | 20/70/10 | 340 | 91.7 | 83.3 | 76.4 |
| 10 | 10/85/5 | 340 | 90.2 | 85.6 | 77.2 |
| 11 | 15/80/5 | 320 | 98.5 | 86.4 | 85.1 |
| 12 | 20/75/5 | 320 | 99.4 | 84.3 | 83.8 |
| 13 | 30/65/5 | 320 | 97.0 | 83.4 | 81.0 |
| 14 | 35/60/5 | 340 | 88.2 | 85.0 | 75.0 |
| 15 | 10/87.5/2.5 | 340 | 82.8 | 86.0 | 71.2 |
| 16 | 20/77.5/2.5 | 340 | 97.4 | 79.7 | 77.6 |
| 17 | 30/67.5/2.5 | 340 | 93.5 | 78.9 | 73.8 |
| d | 1/82/17 | 360 | 29.0 | 54.9 | 15.9 |
| e | 30/55/15 | 360 | 78.6 | 71.2 | 56.0 |
| f | 4/89/7 | 360 | 82.5 | 78.1 | 64.4 |
| g | 40/55/5 | 340 | 78.9 | 73.3 | 57.8 |

In addition, the reaction was continued for 150 days under the same reaction conditions as Example 11 using the same catalyst as Example 11. The activity of the catalyst for selectively producing acrylic acid was not decreased.

Examples 18–23 and control runs (h)–(k)

The compound ratios of the catalyst components shown in Table 3 were employed.

Ammonium metavanadate ($NH_4VO_3$) and ammonium p-molybdate (($NH_4$)$_6Mo_7O_{24} \cdot 4H_2O$) were dissolved in 120 ml. of warm water and after adding 2 ml. of 28% aqueous ammonia, a solution of lead acetate ($Pb(NO_3)_2$) in 5 ml. of warm water was added to the solution. The resulting solution was added to 165 ml. of 30% silica sol (made by Nissan Kagaku K.K.) with stirring and the resulted mixture was dried by means of a spray dryer. The powders thus obtained were dried at 150° C. for about 3 hours in a dryer and then heat-treated at 285° C. Then 50 ml. of the powders were charged in a fluidized bed-type stainless steel reactor having an inside diameter of 36.0 mm. and a length of 800 mm. and a gaseous feed consisting of 3.8% by volume acrolein, 5.8% by volume oxygen, 31.1% by volume nitrogen, and 59.3% by volume steam was introduced to the reactor at space velocity of 1200 hr.$^{-1}$ and at a temperature of 400° C. for 3 hours. The compounding ratio of the catalyst thus prepared was almost the same as that of the raw materials used and the proportion of the catalyst components deposited to the carrier was 20 parts by weight as $V_2O_5$—$MoO_3$—$PbO$ per 100 parts by weight of the carrier. Thereafter, while reducing the reaction temperature, the samples were collected at a temperature of 360–280° C. and analyzed, whereby the results of the reaction at the optimum reaction temperature were compared. The experimental results are shown in Table 3.

TABLE 3

| Examples and comparison examples | Catalyst composition V/Mo/Pb atomic ratio (percent) | Optimum reaction temperature (° C.) | Reaction product (percent) | | |
|---|---|---|---|---|---|
| | | | Conversion of acrolein | Selectivity for acrylic acid | Yield of acrylic acid |
| 18 | 10/65/25 | 320 | 93.6 | 84.2 | 78.8 |
| 19 | 10/75/15 | 320 | 94.1 | 84.1 | 79.1 |
| 20 | 10/85/5 | 320 | 96.7 | 84.7 | 81.9 |
| 21 | 15/80/5 | 300 | 97.9 | 85.2 | 83.4 |
| 22 | 20/75/5 | 300 | 97.6 | 85.1 | 83.1 |
| 23 | 30/65/5 | 280 | 94.4 | 82.9 | 78.3 |
| h | 40/35/25 | 360 | 58.3 | 34.2 | 19.9 |
| i | 40/45/15 | 360 | 49.9 | 36.8 | 18.4 |
| j | 35/57.5/7.5 | 340 | 83.3 | 68.1 | 56.7 |
| k | 4/89/7 | 360 | 78.0 | 71.8 | 56.0 |

EXAMPLE 24

The same procedure as in Example 11 was carried out except that granular carriers of carborundum were used instead of silica gel carriers to prepare a catalyst. 53.1 g. (50 ml.) of the catalyst was charged in a fixed bed-type steel reactor and after conducting the same pre-treatment as in Example 11, the oxidation of acrolein was carried out under the same conditions as Example 11. The reaction at the optimum temperature of 340° resulted in the conversion of acrolein, the selectivity for acrylic acid and the yield of acrylic acid of 92.8%, 83.9% and 77.9%, respectively.

EXAMPLE 25

The compounding ratio of the catalyst component was the same as in Example 21.

Ammonium metavanadate and ammonium p-molybdate were dissolved in 120 ml. of warm water and then 2 ml. of 28% aqueous ammonia, and an aqueous warm solution of lead nitrate were added to the solution. Thereafter, to 54.4 g. of silica gel (S–50A: trade name of Dokai Kagaku K.K.) having a grain size of 6–10 mesh placed in an evaporating dish was added the resulting solution. Then, the resulting mixture was evaporated to dryness with agitation on a water bath to deposit it on the carrier. After drying the system at 150° C., 50 ml. of the dried substance was charged in a fixed bed-type stainless steel reactor having an inside diameter of 16 mm. and a length of 800 mm. and while introducing 500 ml./min. of air, the temperature was raised gradually to 300° C. and the system was treated at the temperature for 3 hours. Then, the introduction of air was ceased and a gaseous feed was charged. The substance treated with air was further treated at 400° C. for 3 hours to provide a catalyst for a fixed bed-type system. The proportion of the catalyst components deposited on the carrier was 20 parts by weight as $V_2O_5$—$MoO_3$—PbO per 100 parts by weight of the carrier. After the composition of the gaseous feed was changed to 5.0% by volume acrolein, 7.0% by volume oxygen, 48% by volume nitrogen, and 40% by volume steam (space velocity 1050 hr.$^{-1}$), the reaction temperature was decreased and the samples were collected at a temperature of 360–280° C. and analyzed. The results were as follows: At the optimum reaction temperature of 310° C., the conversion of acrolein, the selectivity for acrylic acid and the yield of acrylic acid were 99.1%, 86.3% and 85.5%, respectively.

In addition, when the operation was continued for 25 days, the activity of the catalyst for selectively producing acrylic acid was not decreased.

EXAMPLE 26

The same procedure as in Example 25 was carried out except that fire stone carrier was used instead of the silica gel carrier to prepare the catalyst. Thereafter, 50 ml. of the catalyst was charged in the solid fixed bed-type steel reactor and after conducting the same the pre-treatment as in Example 25, the oxidation of acrolein was carried out under the same reaction conditions as in Example 25. As the results of the reaction at the optimum reaction temperature of 340° C., the conversion of acrolein, the selectivity for acrylic acid and the yield of acrylic acid were 86.6%, 78.9% and 68.3%, respectively.

EXAMPLES 27–32

The same procedure as in Example 4 was carried out while manganese nitrate ($Mn(NO_3)_2.4H_2O$) (Example 27), uranyl nitrate ($UO_2(NO_3)_2.6H_2O$) (Example 28), copper nitrate ($Cu(NO_3)_2.3H_2O$) (Example 29), chloroauric acid ($AuCl_3.HCl.4H_2O$) (Example 30), or barium nitrate ($Ba(NO_3)_2$) (Example 31) was used instead of germanium oxide and also manganese nitrate was further added to the same composition as in Example 4 (Example 32) to prepare catalysts. After charging the catalyst in the fluidized bed-type stainless steel reactor, the oxidation of acrolein was carried out under the same reaction conditions as in Example 4. The results are shown in Table 4.

TABLE 4

| Example | Catalyst composition V/Mo/X | Optimum reaction temperature (° C.) | Conversion of acrolein | Selectivity for acrylic acid | Yield of acrylic acid |
|---|---|---|---|---|---|
| 27 | V/Mo/Mn=15/80/5 | 330 | 97.7 | 84.0 | 82.1 |
| 28 | V/Mo/U=15/80/5 | 300 | 98.2 | 86.9 | 85.4 |
| 29 | V/Mo/Cu=15/80/5 | 310 | 97.2 | 86.7 | 84.3 |
| 30 | V/Mo/Au=15/80/5 | 310 | 96.6 | 83.9 | 81.1 |
| 31 | V/Mo/Ba=15/80/5 | 280 | 97.0 | 84.7 | 82.2 |
| 32 | V/Mo/Ge/Mn=14.3/76.2/4.75/4.75 | 320 | 99.1 | 87.6 | 86.8 |

Note.—In addition, the proportion of the catalyst components to the carrier was 20 parts by weight to 100 parts of the carrier as $MnO_2$, $UO_3$, CuO, $Au_2O_3$ and BaO for X component in Examples 27–31 and also as $GeO_2 + MnO_2$ for X component in Example 32, respectively.

EXAMPLES 33–43

The same procedure as in Example 21 was carried out while using selenium dioxide ($SeO_2$) (Example 33), cobalt nitrate ($Co(NO_3)_2.6H_2O$) (Example 34), silver nitrate ($AgNO_3$) (Example 35), magnesium nitrate ($Mg(NO_3)_2.6H_2O$) (Example 36), boric acid ($H_3BO_3$) (Example 37), strontium nitrate ($Sr(NO_3)_2.4H_2O$) (Example 39), calcium nitrate ($Ca(NO_3)_2.4H_2O$) (Example 40), zinc nitrate ($Zn(NO_3)_2.6H_2O$) (Example 41), or cadmium nitrate ($Cd(NO_3)_2.4H_2O$) (Example 42) instead of lead nitrate and also adding further silver nitrate to the same catalyst components as in Example 21 (Example 39), calcium nitrate ($Ca(NO_3)_2 4H_2O$) (Example the oxidation of acrolein was carried out under the same reaction conditions as Example 21 using the fluidized bed-type stainless steel reactor. The experimental results are shown in Table 5.

TABLE 5

| Example | Catalyst composition V/MoY atomic ratio (percent) | Optimum reaction temperature (° C.) | Conversion of acrolein | Selectivity for acrylic acid | Yield of acrylic acid |
|---|---|---|---|---|---|
| 33 | V/Mo/Se=15/80/5 | 290 | 96.7 | 84.5 | 81.7 |
| 34 | V/Mo/Co=15/80/5 | 300 | 93.4 | 84.6 | 79.0 |
| 35 | V/Mo/Ag=15/80/5 | 320 | 96.1 | 82.3 | 79.1 |
| 36 | V/Mo/Mg=15/80/5 | 320 | 90.9 | 81.8 | 74.4 |
| 37 | V/Mo/B=15/80/5 | 300 | 92.6 | 80.3 | 74.4 |
| 39 | V/Mo/Sr=15/80/5 | 300 | 90.2 | 83.1 | 75.0 |
| 40 | V/Mo/Ca=15/80/5 | 330 | 94.1 | 81.4 | 76.6 |
| 41 | V/Mo/Zn=15/80/5 | 330 | 93.7 | 82.4 | 77.2 |
| 42 | V/Mo/Cd=15/80/5 | 330 | 92.7 | 82.9 | 76.9 |
| 43 | V/Mo/Pb/Ag=14.3/76.2/4.75/4.75 | 300 | 99.2 | 84.8 | 84.1 |

Note.—In addition, the proportion of the catalyst components deposited on the carrier was 20 parts by weight per 100 parts by weight of the carrier as $SeO_2$, CoO, $Ag_2O$, MgO, $B_2O_3$, $WO_3$, SrO, CaO, ZnO and CdO each for Y component in Examples 33–42 and also as PbO + $Ag_2O$ for Y component in Example 43, respectively.

We claim:
1. A process for the production of acrylic acid by oxidation of acrolein in the vapor phase with molecular oxygen in the presence of a catalyst which consists of (1) an oxide or an oxygenated compound of vanadium, (2) an oxide or an oxygenated compound of molybdenum, and (3) an oxide or an oxygenated compound of one or two elements designated by X, in which X is germanium, uranium, manganese, gold or barium, or one or two elements designated by the symbol Y, in which Y is selenium, cobalt, lead, silver, magnesium, boron, strontium, calcium, zinc, or cadmium, and in which catalyst, the composition ratio of the components in terms of the gram atom percent is defined by the equalities $V+Mo+X=100$, or $V+Mo+Y=100$, wherein the gram atom percent of vanadium is 5–40; the gram atom percent of molybdenum is 59–94; the gram atom percent of X is 1–36 and the gram atom percent of Y is 1–36.

2. A process according to claim 1, wherein the molecular oxygen is provided by air, oxygen and oxygen enriched air.

3. A process according to claim 1, wherein the vapor phase oxidation is carried out in the presence of steam as a diluent.

4. A process according to claim 1, wherein the vapor phase oxidation is carried out in the presence of propylene or isobutylene.

5. A process according to claim 1, wherein the catalyst is supported on a carrier.

6. A process according to claim 5, wherein the carrier is silica.

7. A process according to claim 1, wherein the vapor phase oxidation is carried out at temperatures of 250 to 400° C. by use of a gaseous feed having acrolein in the concentration of 1–10 vol. percent of the feed, and molar ratios of 0.3–10.0 of oxygen to acrolein and molar ratios of 3.0–10.0 of steam to acrolein in the feed.

8. A process according to claim 1, wherein the proportion of the catalyst components deposited to the carrier is 10–100 parts by weight to 100 parts by weight of a carrier.

9. A process according to claim 1, wherein the catalyst is prepared from an aqueous solution of the salts of catalyst elements by depositing the metallic salts on a carrier and then treated by a first pre-treatment with air at temperatures of about 200 to 350° C. followed by a second pre-treatment with gaseous feed consisting of acrolein, oxygen and inert gases at temperatures of about 300 to 450° C.

References Cited
UNITED STATES PATENTS

| | | | |
|---|---|---|---|
| 3,405,172 | 10/1968 | Brown et al. | 260—533 N |
| 3,542,842 | 11/1970 | Grasselli et al. | 260—533 N |
| 3,567,772 | 3/1971 | Yanagita et al. | 260—530 N |

FOREIGN PATENTS

| | | | |
|---|---|---|---|
| 903,034 | 9/1962 | Great Britain | 260—533 |
| 1,106,648 | 3/1968 | Great Britain | 260—530 |
| 1,107,478 | 3/1968 | Great Britain | 260—530 |
| 1,520,089 | 4/1968 | France | 260—530 N |

LORRAINE A. WEINBERGER, Primary Examiner

R. D. KELLY, Assistant Examiner

U.S. Cl. X.R.

252—437, 456, 464, 467, 468, 469, 470